US012093793B2

(12) United States Patent
Goldsteen et al.

(10) Patent No.: US 12,093,793 B2
(45) Date of Patent: Sep. 17, 2024

(54) MEMBERSHIP LEAKAGE QUANTIFICATION TO VERIFY DATA REMOVAL

(71) Applicant: INTERNATIONAL BUSINESS MACHINES CORPORATION, Armonk, NY (US)

(72) Inventors: Abigail Goldsteen, Haifa (IL); Ron Shmelkin, Haifa (IL)

(73) Assignee: International Business Machines Corporation, Armonk, NY (US)

(*) Notice: Subject to any disclaimer, the term of this patent is extended or adjusted under 35 U.S.C. 154(b) by 869 days.

(21) Appl. No.: 17/191,179

(22) Filed: Mar. 3, 2021

(65) Prior Publication Data

US 2022/0284341 A1 Sep. 8, 2022

(51) Int. Cl.
*G06N 20/00* (2019.01)
(52) U.S. Cl.
CPC .................... *G06N 20/00* (2019.01)
(58) Field of Classification Search
None
See application file for complete search history.

(56) References Cited

U.S. PATENT DOCUMENTS

| | | |
|---|---|---|
| 10,225,277 B1 | 3/2019 | Shintre |
| 2019/0050367 A1 | 2/2019 | Saur |
| 2019/0332800 A1 | 10/2019 | Veeraragavan |

OTHER PUBLICATIONS

Mao, et al., A Novel User Membership Leakage Attack in Collaborative Deep Learning, 2019 11th International Conference on Wireless Communications and Signal Processing (WCSP), Oct. 25, 2019, pp. 1-6 (Year: 2019).*
Li, et al., Membership Leakage in Label-Only Exposures, CCS '21: Proceedings of the 2021 ACM SIGSAC Conference on Computer and Communications Security, Nov. 2021, pp. 880-895 (Year: 2021).*
Farokhi et al., "Modelling and Quantifying Membership Information Leakage in Machine Learning," arXiv:2001.10648v2 [cs.LG] Apr. 28, 2020, Retrieved from the Internet: <https://arxiv.org/abs/2001.10648>, 13 pages.

(Continued)

*Primary Examiner* — Wilbert L Starks
(74) *Attorney, Agent, or Firm* — Caleb D. Wilkes

(57) ABSTRACT

A method, computer system, and a computer program product for testing a data removal from a trained machine learning model trained with a training data set are provided. A new machine learning model is trained by using an altered data set that includes training data from the training data set. The altered data set is without removal data. A first forgetting mechanism is applied to the trained machine learning model to form a first revised machine learning model. The applying includes removing the removal data from the trained machine learning model. A first membership leakage quantification on the first revised machine learning model is performed to quantify a first membership leakage of the removal data and that uses the new machine learning model for comparison. A first leakage score is determined from the first membership leakage quantification to test the forgetting mechanism.

20 Claims, 6 Drawing Sheets

(56) References Cited

OTHER PUBLICATIONS

Golatkar et al., "Eternal Sunshine of the Spotless Net: Selective Forgetting in Deep Networks," arXiv:1911.04933v5 [cs.LG] Mar. 31, 2020, Retrieved from the Internet: <https://arxiv.org/abs/1911.04933>, 14 pages.

Graves et al., "Amnesiac Machine Learning," arXiv:2010.10981v1 [cs.LG] Oct. 21, 2020, Association for the Advancement of Artificial Intelligence, Retrieved from the Internet: <https://arxiv.org/pdf/2010.10981.pdf>, 9 pages.

Guo et al., "Certified Data Removal from Machine Learning Models," Proceedings of the 37th International Conference on Machine Learning, Online, PMLR 119, 2020, arXiv:1911.03030v5 [cs.LG] Aug. 14, 2020, Retrieved from the Internet: <https://arxiv.org/abs/1911.03030>, 14 pages.

Izzo et al., "Approximate Data Deletion from Machine Learning Models," arXiv:2002.10077v2 [cs.LG] Feb. 23, 2021, International Conference on Artificial Intelligence and Statistics (AISTATS), Retrieved from the Internet: <https://arxiv.org/pdf/2002.10077.pdf>, 20 pages.

Long et al., "Towards Measuring Membership Privacy," arXiv:1712.09136v1 [cs.CR] Dec. 25, 2017, Retrieved from the Internet: <https://arxiv.org/pdf/1712.09136.pdf>, 18 pages.

Mell et al., "The NIST Definition of Cloud Computing", National Institute of Standards and Technology, Special Publication 800-145, Sep. 2011, 7 pages.

Shokri et al., "Membership Inference Attacks Against Machine Learning Models," arXiv:1610.05820v2 [cs.CR] Mar. 31, 2017, Retrieved from the Internet <https://arxiv.org/pdf/1610.05820.pdf>, 16 pages.

Sommer et al., "Towards Probabilistic Verification of Machine Unlearning," arXiv:2003.04247v2 [cs.CR] Dec. 1, 2020, Retrieved from the Internet: <https://arxiv.org/pdf/2003.04247.pdf>, 21 Pages.

Bourtoule et al., "Machine Unlearning," arXiv:1912.03817v3 [cs.CR] Dec. 15, 2020, 42nd IEEE Symposium of Security and Privacy, Retrieved from the Internet: <https://arxiv.org/pdf/1912.03817.pdf>, 19 pages.

Chen et al., "When Machine Unlearning Jeopardizes Privacy," arXiv:2005.02205v1 [cs.CR] May 5, 2020, Retrieved from the Internet: <https://arxiv.org/pdf/2005.02205v1.pdf>, 18 pages.

Garg et al., "Formalizing Data Deletion in the Context of the Right to be Forgotten," arXiv:2002.10635v1 [cs.CR] Feb. 25, 2020, Retrieved from the Internet: <https://arxiv.org/pdf/2002.10635v1.pdf>, 36 pages.

Ginart et al., "Making AI Forget You: Data Deletion in Machine Learning," arXiv:1907.05012v2 [cs.LG] Nov. 4, 2019, Retrieved from the Internet: <https://arxiv.org/pdf/1907.05012.pdf>, 28 pages.

Github, "DWT-DCT-Digital-Image-Watermarking," [accessed Dec. 10, 2020], Retrieved from the Internet: <https://github.com/diptamath/DWT-DCT-Digital-Image-Watermarking>, 2 pages.

Sablayrolles et al., "Radioactive data: tracing through training," arXiv:2002.00937v1 [stat.ML] Feb. 3, 2020, Retrieved from the Internet: <https://arxiv.org/pdf/2002.00937v1.pdf>, 11 pages.

\* cited by examiner

MEMBERSHIP LEAKAGE QUANTIFICATION TO VERIFY DATA REMOVAL

BACKGROUND

The present invention relates generally to the field of 'right to be forgotten' requests, and more particularly to using computing to evaluate the fulfilling of such requests in artificial intelligence.

SUMMARY

According to one exemplary embodiment, a method for testing a data removal from a trained machine learning model trained with a training data set is provided. At least one new machine learning model is trained by using an altered data set. The altered data set includes training data from the training data set. The altered data set is without removal data. A first forgetting mechanism is applied to the trained machine learning model to form at least one first revised machine learning model. The applying of the first forgetting mechanism includes removing the removal data from the trained machine learning model. A first membership leakage quantification on the at least one first revised machine learning model is performed. The first membership leakage quantification quantifies a first membership leakage of the removal data and uses the at least one new machine learning model for comparison. A first leakage score is determined from the first membership leakage quantification. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and computer program product for data removal testing as it relates to machine learning models. The present embodiments have the capacity to improve the technical field of removing data from trained machine learning models, for example when a request for forgetting is directed to the machine learning model. A right to be forgotten is established in many jurisdictions. Therefore, owners of artificial intelligence and machine learning models that have used some consumer data to train their models will need to correct their model in response to receiving a request to be forgotten. The present disclosure helps evaluate the effectiveness of forgetting mechanisms that may be applied to trained machine learning models to help the models forget certain data. This forgetting may also be referred to as data removal. The present disclosure may help model owners to rate the effectiveness of various forgetting mechanisms so that they can better choose which forgetting mechanism to permanently implement for their system and model. The present disclosure may also help model owners prove to consumers that they have sufficiently responded to a request that the consumer makes requesting to be forgotten. The present disclosure is not restricted for implementation with respect to linear machine learning models. The present disclosure is not tied to any specific model attack and therefore does not suffer from drawbacks or assumptions associated with specific model attacks. The present disclosure does not require altering training data prior to originally training a model and can be implemented on already existing machine learning models. The present disclosure may be applied with either black box or white box knowledge of the machine learning model and is not dependent on model overfitting for success.

Figure 1:
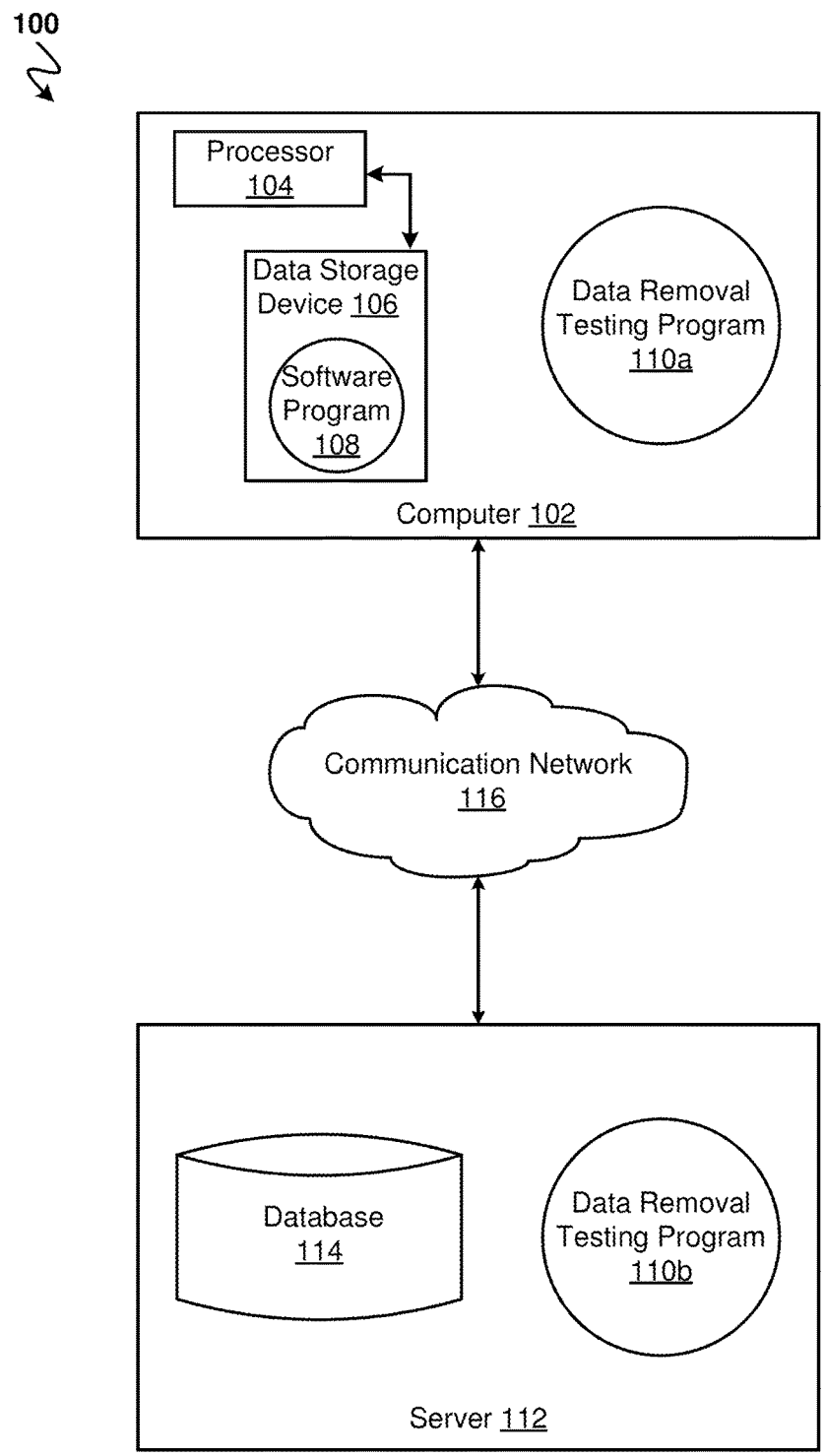
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data removal testing program 110a. The networked computer environment 100 may also include a server 112 that is a computer and that is enabled to run a data removal testing program 110b that may interact with a database 114 and a communication network 116. The networked computer environment 100 may include a plurality of computers 102 and servers 112, although only one computer 102 and one server 112 are shown in FIG. 1. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communications network 116. The communications network 116 may include connections, such as wire, wireless communication links, or fiber optic cables. As will be discussed with reference to FIG. 4, server 112 may include internal components 402a and external components 404a, respectively, and client computer 102 may include internal components 402b and external components 404b, respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the client computer 102. According to various implementations of the present embodiment, the data removal testing program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data removal testing program 110a, 110b to evaluate how well data has been removed from a trained machine learning model. The data removal testing process 200 is explained in more detail below with respect to FIGS. 2 and 3.

Figure 2:
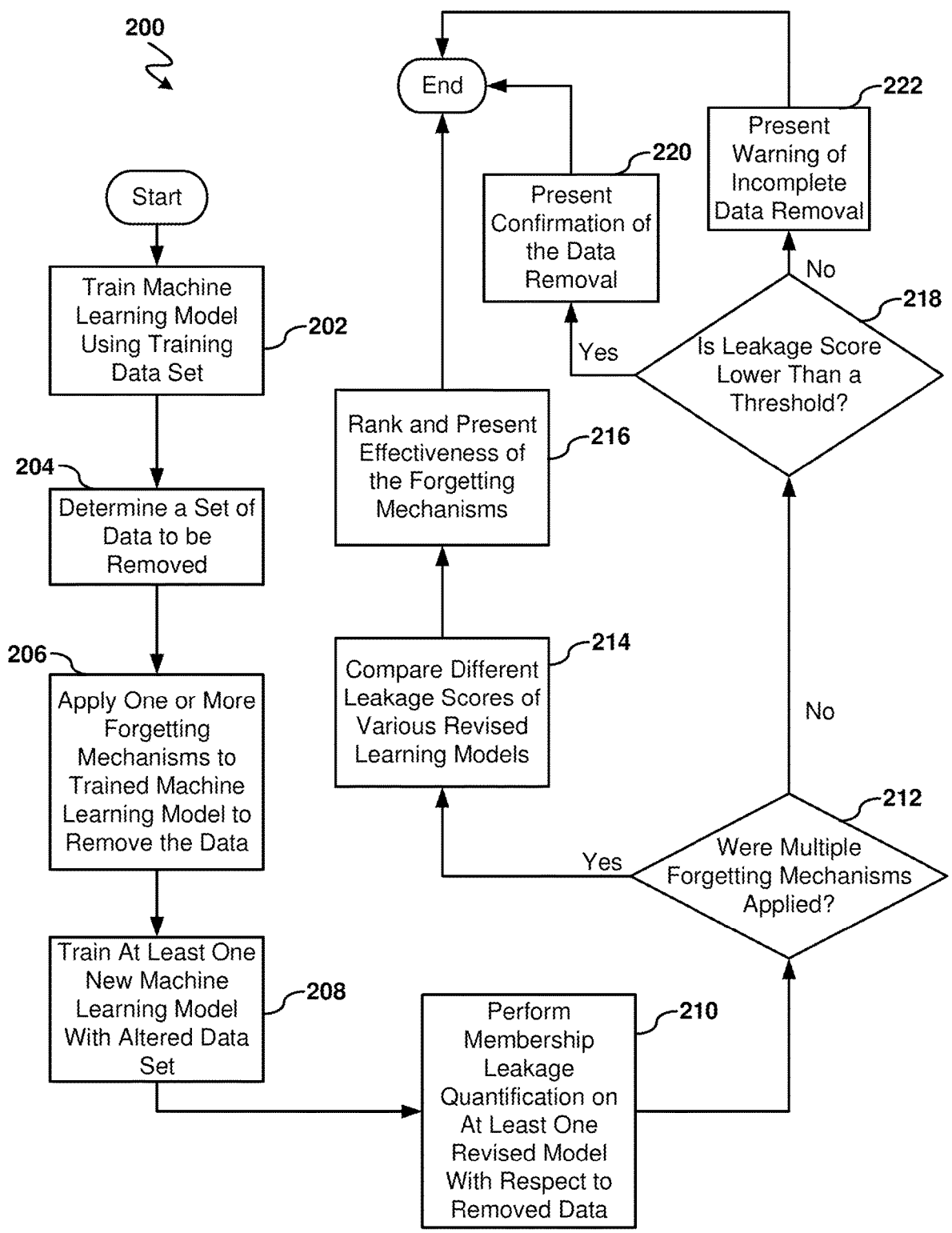
FIG. 2 is an operational flowchart illustrating a process for data removal testing according to at least one embodiment.

Referring now to FIG. 2, an operational flowchart depicts a data removal testing process 200 that may, according to at least one embodiment, be performed by the data removal testing program 110a, 110b. It may be appreciated that FIG. 2 provides only an illustration of one embodiment and does not imply any limitations with regard to how different embodiments may be implemented. Many modifications to the depicted embodiment(s), e.g., to a depicted sequence of steps, may be made based on design and implementation requirements.

Figure 3:
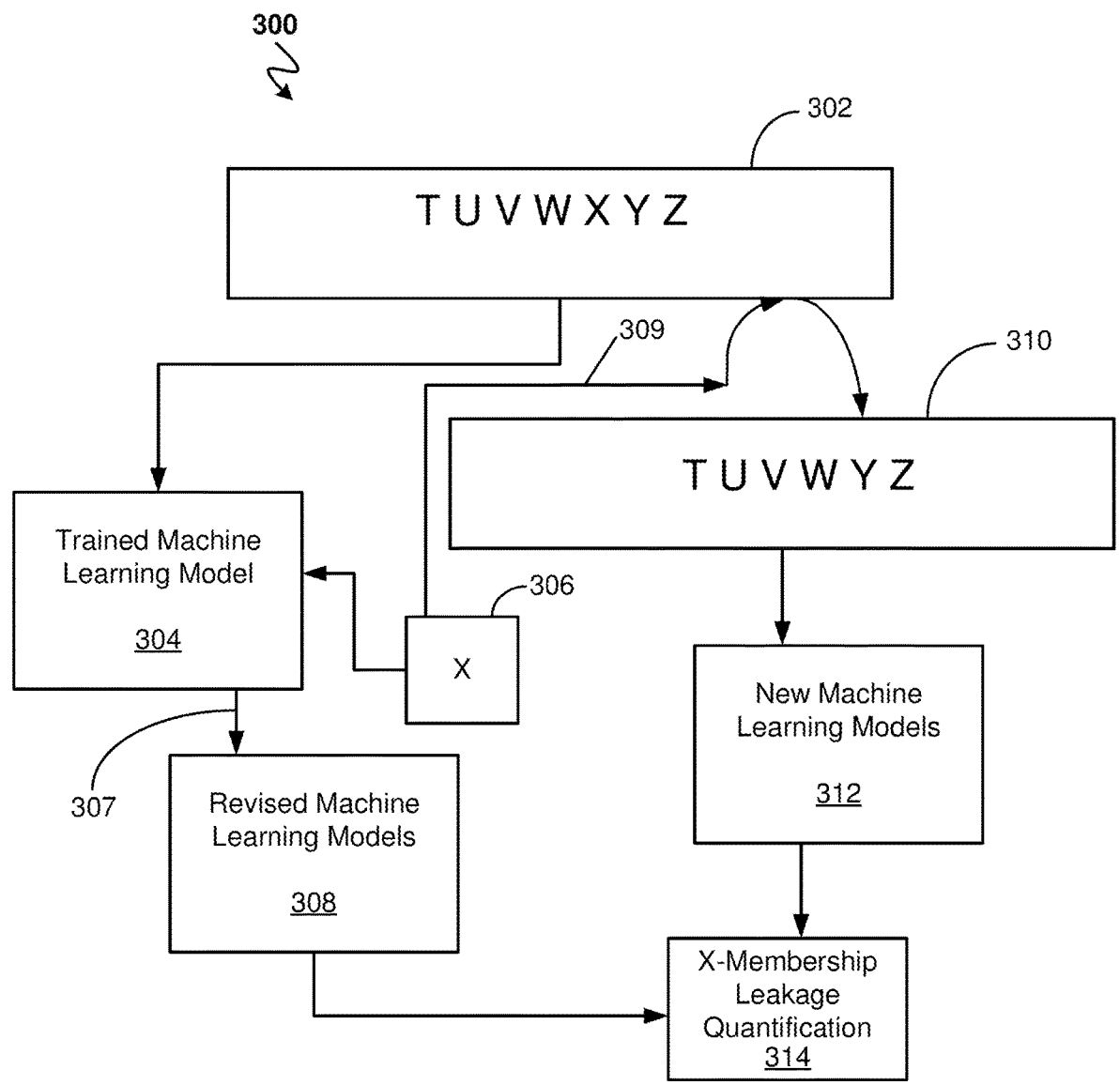
FIG. 3 shows an example of a system pipeline for data removal testing according to at least one embodiment.

In a step 202 of the data removal testing process 200, a machine learning model may be trained using a training data set. In the data removal testing pipeline 300 shown in FIG. 3, a training data set 302 is shown which includes exemplary data T, U, V, W, X, Y, and Z. These different individual letters may represent a respective data set corresponding to different individual consumers. This data set shows seven individual data points or sets. The training data set 302 may include many more individual data points or sets, e.g., may include hundreds, thousands, or millions of individual data sets or points or more. Training of a machine learning model may occur by feeding or inputting the training data set 302 into an untrained machine learning model or by feeding additional data into a partially or already trained machine learning model. For the latter option as a case of transfer learning, the data removal testing process 200 may be applied to a machine learning model in which some data pieces were input to further train an already trained model, e.g., a partially trained model. The result of step 202 may be the formation of a trained machine learning model 304 that is shown in FIG. 3. Machine learning models may include naive Bayes models, random decision tree models, linear statistical query models, logistic regression models, neural network models, e.g. convolutional neural networks, multilayer perceptrons, residual networks, long short-term memory architectures, and other models.

The process of training a machine learning model may include providing training data to a learning algorithm or to a machine learning algorithm. The machine learning model is the model structure or system that is created by the training process. The training data should include targets or target attributes which include a correct answer. The learning algorithm finds patterns in the training data in order to map the input data attributes to the target. The machine learning model contains these patterns so that the answer can be predicted for similar future inputs. A machine learning model may be used to obtain predictions on new data for which the target is unknown. The machine learning model uses the patterns to decipher other new targets in response to being fed new data that did not have a label applied. The training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the computer 102 or at another computer associated with the server 112. The machine learning model that is generated may be stored on the computer 102 or on the server 112 or on another external server accessible to the computer 102 and to the server 112 via the communication network 116.

In some embodiments, the data removal testing process 200 will be performed starting from an already-trained machine learning model. In other words, with these embodiments of performing the data removal testing process 200 the step 202 may be skipped. The organization leading the data removal is typically aware of the contents of the original and subsequent data sets that were input, e.g., are typically aware of the contents of the training data set 302. Therefore, such organization or owner will typically know whether a request from a particular party for data to be forgotten/removed is relevant to a particular machine learning model, i.e. pertains to data that was used to train the machine learning model.

The training data set 302 may have been gathered over time and may have included some original data but also other data that was subsequently input into the machine learning model. Such subsequently input may have helped additionally train the machine learning model to form the trained machine learning model 304.

In a step 204 of the data removal testing process 200, a set of data to be removed is determined. This set of data to be removed may be determined according to a data removal request from a first party on which or whom the set of data is based. In the data removal testing pipeline 300 shown in FIG. 3, a determination is made, for example, that a data set represented by the letter X is to be forgotten. This X data set may be referred to as a to-be-forgotten data set 306. In some embodiments, the data removal testing process 200 will not be applied upon each individual data removal request that is received by the owner of the machine learning model. Rather, the data removal testing process 200 may be applied as a batch process for removing a batch of data, with the batch containing data representing multiple requesters. In some embodiments, individual parties or entities may submit requests to be forgotten to a company. These requests to be forgotten may be submitted in various manners to the company. In a third option, an offline evaluation process may be performed without any relation to a removal request. In this case, the organization that owns or controls the trained machine learning model 304 may choose, e.g., randomly choose, one or more data samples to use for the testing procedure. The one or more data samples may have come from a data set that was input into the trained machine learning model 304 for training.

In a case of transfer learning for the machine learning models, data may have been input into the model for training the model in various stages or batches and not all at the same time. Such staged or batched training may include starting with a base set of data and then proceeding to subsequent batches for training. In many cases, a base dataset may belong to another party or be public data, and the training data that needs to be removed may have come from subsequent training phases. Nevertheless, for the purposes of this disclosure and for the purposes of the data removal testing process 200 the training data set 302 may be considered to encompass that data coming from such a subsequent training phase or coming from the various batches or stages of data together, including such a base set of data.

In a step 206 of the data removal testing process 200, one or more forgetting mechanisms may be applied to the trained machine learning model 304. The application of the one or more forgetting mechanisms is performed in order to remove the data whose removal was determined in step 204. In the example shown in FIG. 3, the to-be-forgotten data set 306 is the data that has been determined to be removed. Various forgetting mechanisms, e.g., removal mechanisms or scrubbing mechanisms, may be implemented in step 206. Forgetting mechanisms may include a Newton update removal mechanism, a weight scrubbing mechanism, or other similar logic or software procedures. Forgetting mechanisms may incorporate or include reorganizing of training data and/or directly updating model parameters to remove effect of removal data. The forgetting mechanism seeks to scrub or remove certain data from a machine learning model so that, after the removal, the machine learning model behaves, e.g., classifies, as if the machine learning model were never aware of the removed data. The data removal testing process 200 does not require a particular forgetting mechanism to achieve success. Rather, the data removal testing process 200 may be performed with respect to any or a variety of forgetting mechanisms, as one purpose of the data removal testing process 200 may be to evaluate the effectiveness of the particular forgetting mechanism or mechanisms that is or are implemented. For embodiments where data removal requests from multiple parties have been received, the step 206 may include removing the data for these multiple parties, e.g., as a batch, and not for a single party alone.

When multiple forgetting mechanisms are applied, each forgetting mechanism may be applied to a fresh set or instance of the trained machine learning model 304. In order to allow better comparison of the multiple forgetting mechanisms to each other, each forgetting mechanism may be applied to the same starting point, e.g., to the same instance of the trained machine learning model 304.

In some embodiments, each forgetting mechanism will be activated to delete the same data set. For an extension of the embodiment of FIG. 3, each forgetting mechanism may be applied to delete the to-be-forgotten data set 306 that is shown in FIG. 3. Then, subsequently the effectiveness of each of the multiple forgetting mechanisms in removing the to-be-forgotten data set 306 from the trained machine learning model 304 may be analyzed and ranked.

In another embodiment, each forgetting mechanism will be activated to delete a different data set that was input into the trained machine learning model 304. Then, subsequently the effectiveness of each of the multiple forgetting mechanisms in removing its respective data set may be ranked by raw numeral comparison of its membership leakage scores as compared to the membership leakage scores which resulted from the revised models produced with the other forgetting mechanisms.

In the data removal testing pipeline 300 shown in FIG. 3, this application of a forgetting mechanism may be seen at the arrow 307. Multiple applications or iterations of this removal may be performed in step 206, so that an entire set of revised machine learning models may be produced. This step 206 may include multiple revised machine learning models or a plurality of revised machine learning models being created, because having multiple revised machine learning models allows a distribution of the revised machine learning models, e.g., a normal or Gaussian distribution, to be examined and compared as discussed below with respect to step 210. This examination of distributions is one type or way of performing a membership leakage quantification. Step 206 may produce ten or one hundred or some other number of revised machine learning models for the distribution and distribution analysis. FIG. 3 shows such a set with the revised machine learning models 308. The data removal testing process 200 may help evaluate how well the forgetting of step 206 was performed as is reflected in the new model structure of the revised model or of the revised machine learning models 308.

In a step 208 of the data removal testing process 200, at least one new machine learning model is trained with an altered data set. FIG. 3 shows such an altered data set 310 particularly with the data representing the consumer or individual represented by the letter X, i.e., the to-be-forgotten data set 306, having been removed from the set. Other data pieces or individual data sets of the training data set 302, e.g., individual data sets T, U, V, W, Y, and Z are still present in the altered data set 310. In some embodiments, all other individual data pieces from the training data set 302 besides those removed in response to requests to be forgotten may be preserved in the altered data set 310. In some other embodiments some or most but not all of those other data pieces may be preserved in the altered data set 310. For at least some embodiments, the at least one new machine learning model will be a plurality of machine learning models, e.g., the new machine learning models 312. For a batch removal process, multiple individual data elements may be removed for the changed data set that is used to create the new machine learning models 312. FIG. 3 shows with a transition arrow 309 how a data removal request may be applied to the training data set 302 to lead towards the creation of an altered data set 310 that is to be newly fed into or input into a system and/or algorithm for training new machine learning models 312. FIG. 3 shows these resulting new machine learning models 312. This step 208 may include multiple new machine learning models 312 or a plurality of new machine learning models 312 being trained. Training multiple new machine learning models 312 allows a distribution of the new machine learning models 312, e.g., a normal or Gaussian distribution, to be examined and compared as discussed below with respect to step 210. This examination of distributions is one type or way of performing a membership leakage quantification. Step 208 may produce ten or one hundred or some other number of new machine learning models 312 for the membership leakage quantification, e.g., for the distribution and distribution analysis. Step 208 will be performed using the same architecture and hyperparameters that were used to train the machine learning model in step 202; however, the data sets that are input will differ. Step 202 used the training data set 302 as an input but step 208 uses the altered data set 310 as an input.

The process of training these new machine learning models 312 may be similar to the process described above for training the trained machine learning model 304. This training for new models may include providing training data to a learning algorithm or to a machine learning algorithm. The machine learning model is the model structure or system that is created by the training process. The training data should include targets or target attributes which include a correct answer. The learning algorithm finds patterns in the training data in order to map the input data attributes to the target. The machine learning model contains these patterns so that the answer can be predicted for similar future inputs. A machine learning model may be used to obtain predictions on new data for which the target is unknown. The machine learning model uses the patterns to identify other targets in response to data being input into the learning model without a label or without supervised classification guidance. The training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the computer 102 or at another computer associated with the server 112. The machine learning model that is generated may be stored on the computer 102 or on the server 112 or on another external server accessible to the computer 102 and to the server 112 via the communication network 116.

In some embodiments, step 206 may be performed in parallel with step 208 instead of being performed before step 208. In other embodiments, step 208 may be performed before step 206. In other embodiments, as shown in FIG. 2 step 206 may be performed before step 208.

In a step 210 of the data removal testing process 200, membership leakage quantification with respect to the removed data is performed on the at least one revised machine learning model. In the data removal testing pipeline 300 shown in FIG. 3, membership leakage quantification is performed with respect to the to-be-forgotten data set 306. Also, this membership leakage quantification from FIG. 3 is performed on the revised machine learning models 308. This membership leakage quantification may quantify a first membership leakage and may use the at least one new machine learning model, e.g., the new machine learning models 312, for comparison. This membership leakage quantification may determine a first leakage score. The membership leakage quantification on the at least one first revised machine learning model may be referred to as a first membership leakage quantification. In the data removal testing pipeline 300 shown in FIG. 3, an X-membership leakage quantification 314 is shown which quantifies any leakage of the to-be-forgotten data set 306 within the revised machine learning models 308 and using the new machine learning models 312 for comparison.

A membership leakage quantification includes theoretical or empirical metrics to estimate the privacy risk of a machine learning model. These metrics are used to measure the amount of information leakage from a trained machine learning model. Information leakage from a machine learning model may relate to the susceptibility of a machine learning model to inadvertently expose the information, through disclosure or through allowing simple inferences, of data that it used to train the model, i.e., was part of a training data set. Quantifying membership leakage may help inform a model owner as to whether their model may be susceptible to adversarial attacks of non-owners. Such adversarial attacks might include the non-owner using the model to learn about individual data sets from the training. In some instances, such an adversarial attack may occur when a non-owner feeds a publicly accessible machine learning model an input and is able to recognize whether the sample was part of the training set of the machine learning model from the output of the machine learning model. These membership quantification metrics have been shown to be highly predictive of the success of membership inference attacks. The owner may use their knowledge of the contents of the training data set to perform the membership leakage quantification as an initial step in preventing adversarial attacks.

Some embodiments of the membership leakage quantification may include comparing a first distribution of the new machine learning models 312 to a second distribution of the revised machine learning models 308. These embodiments may be facilitated by a plurality of new machine learning models being trained in step 208 and by a plurality of first revised machine learning models being generated in step 206 via the application of the one or more forgetting mechanisms. This comparison may be considered to incorporate theoretical metrics for membership leakage quantification, and may require that the operator performing has access to the internal features of the machine learning models, e.g., has access to the internal weights, gradients, and activations of the machine learning model. The comparing of distributions may include performing (1) a first Gaussian approximation of first distribution parameters of a first distribution of the new machine learning models 312 and (2) a second Gaussian approximation of second distribution parameters of a second distribution of the first revised machine learning models 308. This comparison may also include comparing the first Gaussian approximation to the second Gaussian approximation to determine a first difference. The first difference may be used to help determine the first leakage score.

Various characteristics of the machine learning models may be harnessed to generate such model distributions. The first and the second distributions may be formed from one or more of a weight, a gradient, an activation, and an output such as a logit or a probability from the new machine learning models 312 and from the first revised machine learning models 308 and in some embodiments from at least one internal layer of the new machine learning models 312 and of the revised machine learning models 308. Weights are learnable parameters of a machine learning model. When inputs to a machine learning model are transmitted between neurons of the machine learning model, the weights are applied to the inputs along with a bias. Weights control a signal or a strength of a connection between two neurons in the machine learning model. The gradient of a machine learning model may be a vector and may capture partial derivatives of a multi-variable function. The gradient points to a direction where the function increases the most. An activation of a machine learning model helps a network learn complex patterns in data and helps a neuron or model station help determine what value or component is to be fired or transmitted to the next neuron or station. Machine learning models often include multiple layers and may include multiple neurons within each layer. The weight, gradient, or activation may be from one or more of the multiple layers of a machine learning model. A logit and a probability are examples of outputs of a machine learning model that may be a basis for forming the distributions of the machine learning models.

The first distribution may have parameters that may include a respective first mean and/or a respective first standard deviation. The second distribution may have parameters that may include a respective second mean and/or a respective second standard deviation.

For distribution comparison examples of the membership leakage quantification in step 210, one or more analyses including a Kullback-Leibler divergence, a Kolmogorov-Smirnov test, and a T-test may be performed. These analyses may be performed on the distributions, e.g., on the Gaussian distributions, for the revised machine learning models 308 and for the new machine learning models 312.

As multiple revised machine learning models may be created in step 206 and multiple new machine learning models may be trained in step 208, each set of models may have its own distribution. The distribution of new machine learning models may be referred to as a first distribution. The distribution of revised machine learning models may be referred to as a second distribution. Each of the new machine learning models 312 is likely to be similar or substantially similar to the others of the new machine learning models 312, because the same altered data set, e.g., altered data set 310, will be input for each iteration. However, the various sets of new machine learning models 312 may not each be exactly the same due to the stochastic, random, or non-deterministic nature of a machine training process. Each of the revised machine learning models 308 in a first set is likely to be similar or substantially similar to the others of the revised machine learning models 308 in the first set, because the same forgetting mechanism and data removal will be applied for each iteration. However, each set of these various revised machine learning models 308 but may not be exactly the same due to a stochastic or random nature of the forgetting mechanism. Both of these distributions may, therefore, be Gaussian or normal distributions that are bell-shaped and have a mean ($\mu$), a standard deviation ($\sigma$) or ($\Sigma$), and a variance ($\sigma^2$) or ($\Sigma^2$). The mean ($\mu$) and the standard deviation ($\sigma$) or ($\Sigma$) may be referred to as Gaussian parameters. Any linear combination of a fixed collection of normal deviates may be a normal deviate. Many results and methods, such as propagation of uncertainty and least squares parameter fitting, can be derived analytically in explicit form when the relevant variables are normally distributed. Some distributions are not completely Gaussian, e.g., may be more complex than a Gaussian distribution is, but may still be analyzed as Gaussian for comparative purposes. Using Gaussian approximation, a multivariate Gaussian density function may be approximated over the weights, gradients, activations, and/or outputs of a machine learning model. Gaussian parameters for the distribution or sets of distributions may be extracted, e.g., using a Monte-Carlo simulation.

Once the Gaussian parameters are approximated, a Kullback-Leibler divergence may be computed to measure information leakage. Kullback-Leibler divergence for multivariate normal distributions may be used to evaluate the Kullback-Leibler information leakage for each sample in the revised machine learning models 308. Using the Gaussian approximation, the formula:

$$\rho_1(x_i,y_i):=D_{KL}(p_1(\theta_c^*)\|p_0(\theta_c^*)=0.5(\text{trace}((\Sigma_0^{xi,yi})-p_\theta+(\mu_o^{xi,yi})-\rho_1^{xi,yi})(\Sigma_0^{xi,yi})(\mu_0^{xi,yi}-\mu_1^{xi,yi})+\ln(\det(\Sigma_0^{xi,yi})/\det(\Sigma_1^{xi,yi})))$$

may be applied.

Similarly, the value of $\rho_2(x_i,y_i):=D_{KL}(p_0(\theta_c^*)\|p_1(\theta_c^*))$ may be evaluated. $\rho_{KL}(\theta_d^*)$ can be approximated by computing $\rho_1(x_i,y_i)$ and $\rho_2(x_i,y_i)$ for a set of data entries $J\subseteq U$.

Computing $\rho_{KL}(\theta_c^*)\approx(1/|J|)\Sigma_{(x,y)\in J}(\rho1(x,y)+\rho2(x,y))$ enables Kullback-Leibler information leakage in machine learning to be approximately computed.

The parameters $\mu_0^{xi,yi}$, $\mu_1^{xi,yi}$, $\Sigma_0^{xi,yi}$, $\Sigma_1^{xi,yi}$ may be extracted by Monte-Carlo simulation with and without $x_i$, $y_i$.

For the distribution comparison, the distribution of the revised machine learning models 308 ideally is equal to the distribution of the new machine learning models 312 if the applied forgetting mechanism is completely effectively removing or scrubbing the requested data from the model. In practice, the distribution of the revised machine learning models 308 might not be perfectly equal to the distribution of the new machine learning models 312. Nevertheless, the smaller the difference between the distribution of the revised machine learning models 308 and the distribution of the new machine learning models 312 correlates to the effectiveness of the forgetting mechanism. If multiple forgetting mechanisms are being analyzed, then the nearer the corresponding distribution of revised machine learning models 308 to a particular forgetting mechanism the better, as it relates to effectiveness of the forgetting in the model. If a first forgetting mechanism generates a difference in distribution (compared to the distribution of the new machine learning models 312) for first revised machine learning models that is smaller than the difference in distribution generated by a second forgetting mechanism (also compared to the new machine learning models 312), then the first forgetting mechanism may be considered to be more effective than the second forgetting mechanism for data removal.

For a Kolmogorov-Smirnov test, a distance between an empirical distribution function of the revised machine learning models 308 and a cumulative distribution function of a reference distribution is quantified. A reference distribution for the data removal testing pipeline 300 shown in FIG. 3, a distribution of the new machine learning models 312 may provide an example of such a reference distribution that is quantified. Alternatively, a distance between the empirical distribution functions of the revised machine learning models 308 and the new machine learning models 312 is quantified. The Kolmogorov-Smirnov may include calculating a least upper bound of the samples.

For a T-test, a difference between the means of the first distribution and the second distribution may be determined. A default null hypothesis may be that the two distributions are equal. If the two distributions are equal, the difference and an entire ratio for the T-test may equal zero. Noise may be introduced as a signal when the two distributions are not equal. If the difference between the two distributions grows in either a positive or negative direction, the signal becomes stronger. The test determines whether an effect size is statistically significant.

Other statistical tests may be applied to compare and measure the differences in the distributions. For example, a Cucconi test, a Shapiro-Wilk test or an Anderson-Darling test may be applied. As the similarity between the revised machine learning models 308 and the new machine learning models 312 increases, the differences in distribution decreases. Achieving a smaller distribution difference between these two groups of distributions is evidence of a more effective data removal or forgetting or scrubbing process.

When multiple forgetting mechanisms were applied to the trained machine learning model 304, the membership leakage quantification of step 210 may also include performing multiple membership leakage quantifications. For example, a respective membership leakage quantification may be performed for each of the other revised machine learning models. If a second forgetting mechanism is applied to the trained machine learning model in step 206 to create a second set of revised machine learning models, a second membership leakage quantification may be performed on the second set of revised machine learning models to determine a second leakage score. This second membership leakage quantification may quantify a second membership leakage and may use the one or more new machine learning models 308 for comparison. This second leakage score may be determined from the second membership leakage quantification. A respective leakage score may similarly be determined for each respective additional forgetting mechanism that is applied to the trained machine learning model 304 to form another revised machine learning model or another set of revised machine learning models.

For the distribution comparison example of membership leakage quantification when multiple forgetting mechanisms were applied, the distribution comparison may include performing a Gaussian approximation of other distribution parameters of the other distributions of the other revised machine learning models. This comparison may also include comparing the first Gaussian approximation to the other Gaussian approximations, respectively, to determine other differences so that the effectiveness of the forgetting mechanisms may be compared to each other. The membership leakage quantification of step 210 for multiple forgetting mechanisms may include the performing of multiple applications of one or more of the analyses of Kullback-Leibler divergence, a Kolmogorov-Smirnov test, a T-test, and others.

In another embodiment of membership leakage quantification of step 210, ratios between output probabilities of revised and new machine learning models may be analyzed to quantify membership leakage and to compare effectiveness of a forgetting mechanism. In this alternative embodiment, membership leakage quantification is performed by using a metric that analyzes ratios between the output probabilities of the models. This embodiment may be an empirical type of membership leakage quantification, as queries are input into training models and the outputs of the training models are analyzed. A target record, a training set of data, and a machine learning model may be used to experimentally quantify membership leakage. With this alternative, a predicted conditional probability of a class label y for a given input feature x may be measured for revised learning models and also for newly trained learning models and, in some embodiments, trained learning models. The predicted conditional probabilities of the two sets may be compared in a ratio. A leakage score in this embodiment may be determined by having the predicted conditional probability of the set of revised learning models divided by the predicted conditional probability of the set of newly trained learning models. Smaller changes in predicted conditional probability correlate to effectiveness of an applied forgetting mechanism.

In a step 212 of the data removal testing process 200, a determination may be made as to whether multiple forgetting mechanisms have been applied. Such multiple forgetting mechanisms might have been applied in step 206 of the data removal testing process 200. In some embodiments, the data removal testing process 200 will evaluate the effectiveness of a lone forgetting mechanism that is applied. In other embodiments, the data removal testing process 200 will evaluate the effectiveness of multiple forgetting mechanisms that are applied. The database 114 of the server 112 may store information as to whether one or more forgetting mechanisms were applied. If a single forgetting mechanism was applied, a single distribution of revised machine learning models 308 will be created via step 206. This single distribution may include multiple instances of the model, but the multiple instances will be part of a single set. A single forgetting mechanism may have a stochastic nature and include some randomness, so applying that single forgetting mechanism to create an entire distribution or set may result in individual revised machine learning models 308 which are not exactly the same but are similar. When multiple forgetting mechanisms are applied, multiple sets or distributions of revised machine learning models 308 will be produced. The data removal testing program 110a, 110b may analyze the number of sets or distributions of revised machine learning models 308 that are saved in a data storage of the system. Alternatively, the data removal testing program 110a, 110b may perform tracking by storing a new count for each different forgetting mechanism that is applied. The counts may be saved in storage and may more quickly be checked for the step 212.

If the step 212 is answered in the affirmative, e.g., with a yes, then a step 214 of the data removal testing process 200 is performed to compare different leakage scores of the various sets of revised machine learning models 308 and new machine learning models 312. This step may include comparing a first leakage score as described above to a second leakage score as described above. This comparison of multiple leakage scores may include comparing (A) the first leakage score, e.g., a comparison between (1) a first set of revised machine learning models and (2) the new machine learning models, to (B) a second leakage score, e.g., a comparison between (1) a second set of revised machine learning models and (2) the new machine learning models. If more than two forgetting mechanisms were applied, then additional leakage scores may be compared as well, with a new leakage score being generated for each new forgetting mechanism that is applied. The leakage score determination may include comparing distributions of multiple sets of machine learning models, e.g., comparing a distribution of first and second revised machine learning models 308 to another distribution of the new machine learning models 312. The respective difference generated for each unique forgetting mechanism that is applied may be generated by a separate comparison to the new machine learning models.

In a step 216 of the data removal testing process 200 that is performed along the affirmative branch from step 212, effectiveness of the various forgetting mechanisms that were applied are ranked and presented. To rank the first forgetting mechanism and the second forgetting mechanism with respect to each other, a lower one of the first leakage score and the second leakage score may indicate that the corresponding first forgetting mechanism or second forgetting mechanism is more effective. The differences in leakage scores may be numerically compared by mathematical comparison functions performed by the data removal testing program 110a, 110b. This data comparison may be performed automatically via software associated with the computer 102 or the server 112 or within the data removal testing program 110a, 110b. The leakage scores with a smaller value may be listed higher in a list with an ascending order of similarity to the new machine learning models 312, with the list indicating ideal test matches. The presenting may be performed visually, e.g., via a display monitor 424 (see FIG. 4) or audibly via a microphone attached to a computer such as the computer 102 or the server 112. An entire list of the applied forgetting mechanisms may be displayed or presented. The leakage scores as compared to the new machine learning models 312 may be presented along with the names and ranking positions of the forgetting mechanisms. The names and leakage scores may be presented with different font or background colors to emphasize the strength of similarity of revised machine learning models 308 compared to the new machine learning models 312.

If the step 212 is answered in the negative, e.g., with a no, then the data testing removal process 200 proceeds to another step 218 which asks whether the leakage score determined in step 210 is lower than a threshold value. A threshold value may be associated with a statistical significance for data such as a p-value. In some embodiments, the threshold value may be 0.05. A threshold value may be chosen corresponding to strictness of a mandated government regulation.

If the other step 218 is answered in the affirmative, e.g., with a yes, in a step 220 of the data removal testing process 200 a confirmation of the data removal is presented. This presentation may be done visually through a GUI generated by the data removal testing program 110a, 110b. This GUI may be presented visually on a display such as display monitor 424 that is part of the computer 102. This presentation may also be done audibly via a speaker of the computer 102. For example, if a leakage score is smaller than a threshold value that corresponds to strictness of a mandated government regulation, a certificate, e.g., a digital certificate, may be generated that may be passed to a consumer or a government authority to solemnify the effective data removal in the machine learning model.

If the other step 218 is answered in the negative, e.g., with a no, in a step 222 of the data removal testing process 200 a warning of incomplete data removal is presented. This presentation may be done visually through a GUI generated by the data removal testing program 110a, 110b. This GUI may be presented visually on a display such as display monitor 424 that is part of the computer 102. This presentation may also be done audibly via a speaker of the computer 102. After receiving this warning, the owner of the trained machine learning model 304 and of the revised machine learning models 308 may be prompted to attempt the data removal with another different forgetting mechanism.

After the conclusion of step 216, step 220, or step 222, the data removal testing process 200 may proceed to an end.

A review check may be performed by performing a review membership leakage quantification on the trained machine learning model 304. This review membership leakage may quantify a second membership leakage and may use the new machine learning models 312 for comparison. The review membership leakage quantification may quantify membership leakage of the removal data, e.g., of the to-be-forgotten data set 306. A review leakage score may be determined from the review membership leakage quantification. The first leakage score may be compared to the review leakage score. The first leakage score being lower than the review leakage score may be an indication of at least partial effectiveness of the forgetting mechanism. It follows that the trained machine learning model 304 which was trained with the training data set 302 that includes the to-be-forgotten data set 306 should have greater traces of membership leakage regarding the to-be-forgotten data set 306 than the revised machine learning models 308 have. The revised machine learning models 308 were created by applying a forgetting mechanism to the trained machine learning model 308 to remove the to-be-forgotten data set 306 from the trained machine learning model 304.

Using this review check helps give perspective regarding the significance of the size of the first leakage score. For example, the review check may help give perspective regarding the significance of the size of a difference in distributions. If the differences between the first and second distributions are small, the forgetting mechanism may nevertheless have been effective if the differences between the trained machine learning model 304 and the new machine learning models 312 are also small. In other words, the forgotten data had a small effect overall on the training, so deleting the forgotten data did not significantly change the trained machine learning model 304. Comparing the first and second distribution differences with differences from the trained machine learning model 304 helps give perspective about significance of sizes of the differences.

An additional confirmation check may be performed by removing from the trained machine learning model other data that was present in training data. For example, this additional confirmation check may be performed by removing from the trained machine learning model 304 any of the data "T" or "U" or "V" used to train the trained machine learning model 304, e.g., that was in the training data set 302. This removal may be performed by using the same forgetting mechanism used in step 206 and then creating other revised machine learning models with their own distribution. Comparing membership leakage of the revised machine learning models 308 and/or the new machine learning models 312 to the membership leakage of this additional revised set with respect to the removal data provides another comparison point. This confirmation check leakage score should be different than the leakage score of the revised machine learning models 308, because different data was removed for the confirmation check as compared to the initial removed data for the data removal testing process 200. This other set or these other sets of revised machine learning models may generate a third or a fourth distribution of models, depending on whether another optional check or review was performed. This confirmation check comparison may help confirm that the leakage differences observed are indeed due to the forgetting mechanism functioning correctly to remove data that was identified for removal. The confirmation check comparison may help verify correct functioning of removal and that favorable leakage scores or difference scores are not caused by one or more unintentional side effects that might result from a forgetting mechanism being applied to the trained machine learning model 304. The confirmation check may help rule out such an unintentional side effect as being a cause of a successful membership leakage quantification in step 210.

The data removal testing program 110a, 110b may in one embodiment be used for a machine learning model owner to evaluate the effectiveness of various forgetting mechanisms. This evaluation may will help the owner choose which forgetting mechanism to consistently incorporate into their system for data removal. As a result of an evaluation that may occur at step 216, an owner of a machine learning model may choose to install the highest ranked forgetting mechanism, e.g., for use with the machine learning model, for data removal procedures based on future data removal requests.

The data removal testing program 110a, 110b may help provide proof for an owner of legally sufficient compliance with a request to be forgotten that was made by a person or outside organization whose data was in the training data set. This proof may be generated through step 220 or by showing the process, computerized calculations, and results of the data removal testing process 200. An owner of a machine learning model could provide a certificate of forgetting to a requesting party or to a government authority overseeing regulations regarding data removal.

Figure 4:
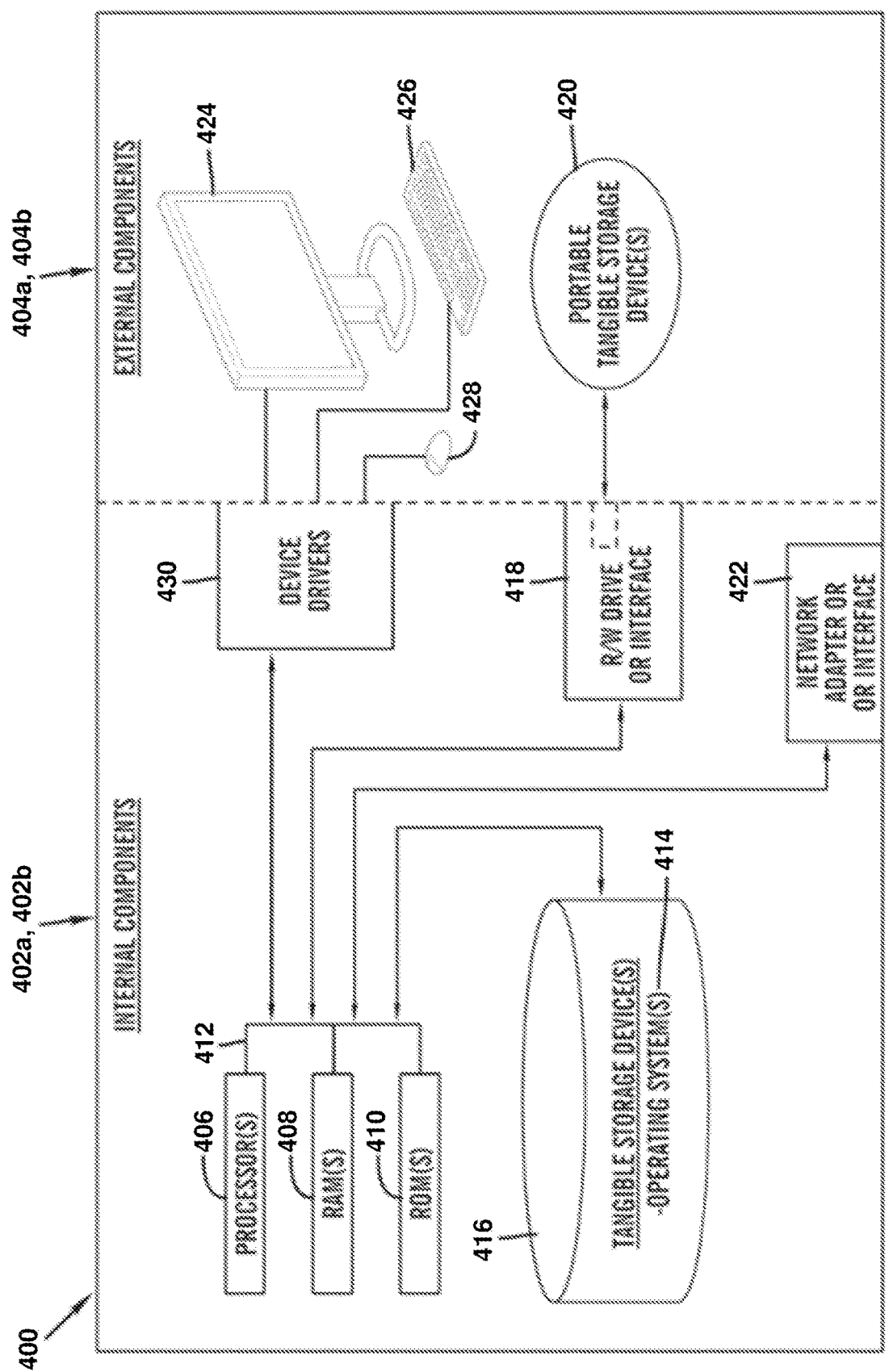
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402a, 402b, 404a, 404b is representative of any electronic device capable of executing machine-readable program instructions. Data processing system 402a, 402b, 404a, 404b may be representative of a smart phone, a computer system, PDA, or other electronic devices. Examples of computing systems, environments, and/or configurations that may represented by data processing system 402a, 402b, 404a, 404b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and server 112 may include respective sets of internal components 402a, 402b and external components 404a, 404b illustrated in FIG. 4. Each of the sets of internal components 402a, 402b includes one or more processors 406, one or more computer-readable RAMs 408 and one or more computer-readable ROMs 410 on one or more buses 412, and one or more operating systems 414 and one or more computer-readable tangible storage devices 416. The one or more operating systems 414, the software program 108, and the data removal testing program 110a in client computer 102, and the data removal testing program 110b in server 112, may be stored on one or more computer-readable tangible storage devices 416 for execution by one or more processors 406 via one or more RAMs 408 (which typically include cache memory). In the embodiment illustrated in FIG. 4, each of the computer-readable tangible storage devices 416 is a magnetic disk storage device of an internal hard drive. Alternatively, each of the computer-readable tangible storage devices 416 is a semiconductor storage device such as ROM 410, EPROM, flash memory, or any other computer-readable tangible storage device that can store a computer program and digital information.

Each set of internal components 402a, 402b also includes a R/W drive or interface 418 to read from and write to one or more portable computer-readable tangible storage devices 420 such as a CD-ROM, DVD, memory stick, magnetic tape, magnetic disk, optical disk or semiconductor storage device. A software program, such as the software program 108 and the data removal testing program 110a, 110b can be stored on one or more of the respective portable computer-readable tangible storage devices 420, read via the respective R/W drive or interface 418 and loaded into the respective hard drive 416.

Each set of internal components 402a, 402b may also include network adapters (or switch port cards) or interfaces 422 such as a TCP/IP adapter cards, wireless wi-fi interface cards, or 3G or 4G wireless interface cards or other wired or wireless communication links. The software program 108 and the data removal testing program 110a in client computer 102 and the data removal testing program 110b in server 112 can be downloaded from an external computer (e.g., server) via a network (for example, the Internet, a local area network or other, wide area network) and respective network adapters or interfaces 422. From the network adapters (or switch port adaptors) or interfaces 422, the software program 108 and the data removal testing program 110a in client computer 102 and the data removal testing program 110b in server 112 are loaded into the respective hard drive 416. The network may include copper wires, optical fibers, wireless transmission, routers, firewalls, switches, gateway computers and/or edge servers.

Each of the sets of external components 404a, 404b can include a computer display monitor 424, a keyboard 426, and a computer mouse 428. External components 404a, 404b can also include touch screens, virtual keyboards, touch pads, pointing devices, and other human interface devices. Each of the sets of internal components 402a, 402b also includes device drivers 430 to interface to computer display monitor 424, keyboard 426 and computer mouse 428. The device drivers 430, R/W drive or interface 418 and network adapter or interface 422 include hardware and software (stored in storage device 416 and/or ROM 410).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
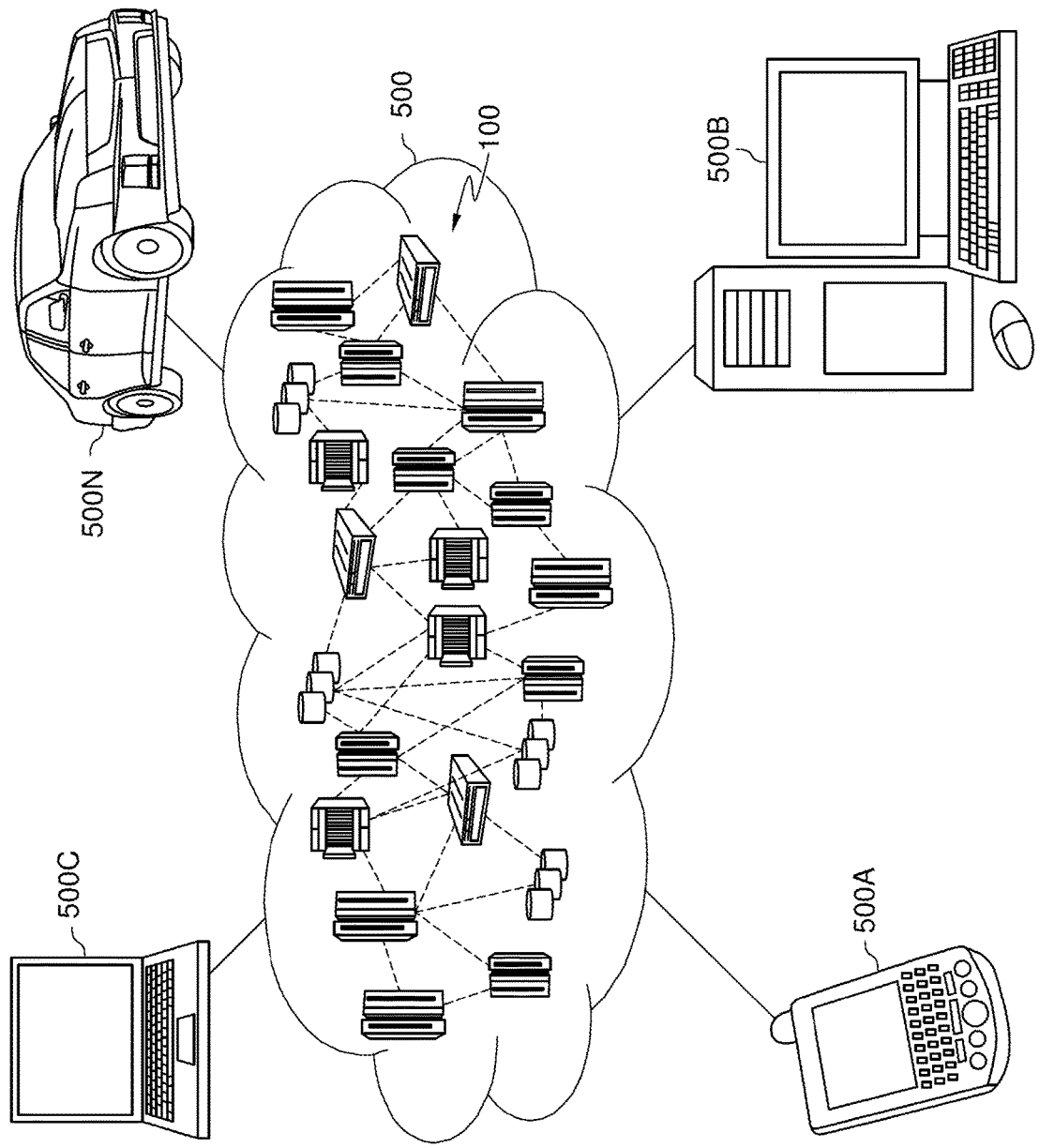
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
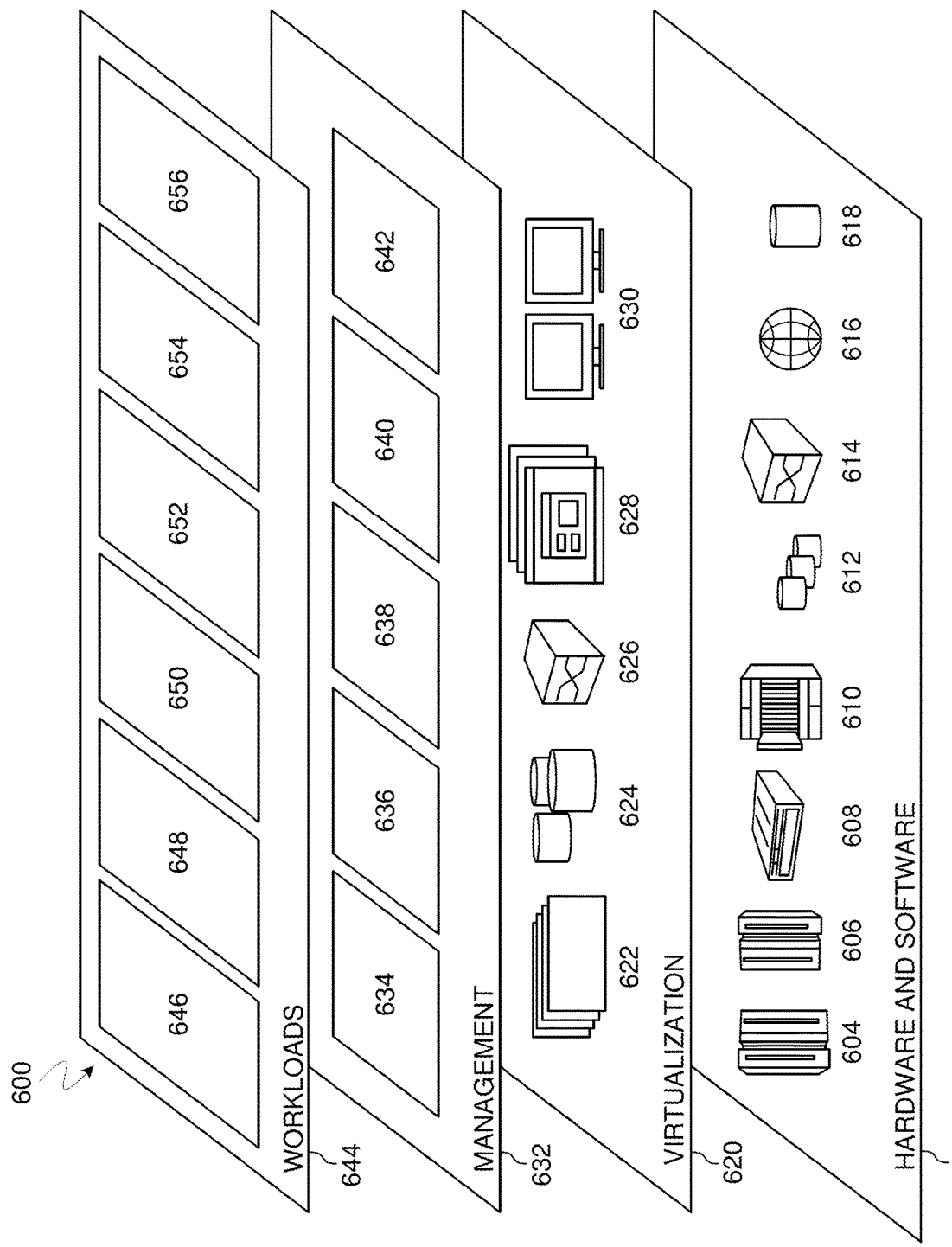
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 is shown. It should be understood in advance that the components, layers, and functions shown in FIG. 6 are intended to be illustrative only and embodiments of the invention are not limited thereto. As depicted, the following layers and corresponding functions re provided:

Hardware and software layer 602 includes hardware and software components. Examples of hardware components include: mainframes 604; RISC (Reduced Instruction Set Computer) architecture based servers 606; servers 608; blade servers 610; storage devices 612; and networks and networking components 614. In some embodiments, software components include network application server software 616 and database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 632 may provide the functions described below. Resource provisioning 634 provides dynamic procurement of computing resources and other resources that are utilized to perform tasks within the cloud computing environment. Metering and Pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provide pre-arrangement for, and procurement of, cloud computing resources for which a future requirement is anticipated in accordance with an SLA.

Workloads layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and data removal testing 656. Data removal testing program 110a, 110b that may be implemented in the layer of data removal testing 656 provides a way to confirm the effectiveness of forgetting mechanisms as applied to machine learning models when right-to-forget requests are received.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing data removal from a trained machine learning model trained with a training data set, the method comprising:
   training at least one new machine learning model by using an altered data set, the altered data set comprising training data from the training data set, the altered data set being without removal data;
   applying a first forgetting mechanism to the trained machine learning model to form at least one first revised machine learning model, the applying of the first forgetting mechanism comprising removing the removal data from the trained machine learning model;
   performing a first membership leakage quantification on the at least one first revised machine learning model, wherein the first membership leakage quantification quantifies a first membership leakage of the removal data and uses the at least one new machine learning model for comparison; and
   determining a first leakage score from the first membership leakage quantification.

2. The method of claim 1, further comprising presenting a confirmation of removal of the removal data if the first leakage score is lower than a threshold.

3. The method of claim 1, further comprising:
   applying a second forgetting mechanism to the trained machine learning model to form at least one second revised machine learning model, the applying of the second forgetting mechanism comprising removing the removal data from the trained machine learning model;
   performing a second membership leakage quantification on the at least one second revised machine learning model, wherein the second membership leakage quantification quantifies a second membership leakage of the removal data and uses the at least one new machine learning model for comparison;
   determining a second leakage score from the second membership leakage quantification; and
   comparing the first leakage score to the second leakage score and ranking the first forgetting mechanism and the second forgetting mechanism based on the comparing.

4. The method of claim 1, wherein the at least one new machine learning model comprises a plurality of new machine learning models;
   wherein the at least one first revised machine learning model comprises a plurality of first revised machine learning models;
   wherein the first membership leakage quantification further comprises:
   comparing a first distribution of the plurality of new machine learning models to a second distribution of the plurality of first revised machine learning models to determine a first difference, wherein the first leakage score is determined based on the first difference.

5. The method of claim 4, wherein the comparing the first distribution to the second distribution comprises determining first distribution parameters and second distribution parameters;
   wherein the first distribution parameters comprise at least one member selected from the group consisting of a respective first mean and a respective first standard deviation; and
   wherein the second distribution parameters comprise at least one member selected from the group consisting of a respective second mean and a respective second standard deviation.

6. The method of claim 4, wherein the comparing the first distribution to the second distribution comprises:
   comparing a first Gaussian approximation of first parameters of the first distribution to a second Gaussian approximation of second parameters of the second distribution; and
   performing at least one test selected from the group consisting of: a Kullback-Leibler divergence, a Kolmogorov-Smirnov test, and a T-test.

7. The method of claim 4, wherein the first and the second distributions are formed from at least one member selected from the group consisting of: a weight, a gradient, an activation, and an output; and
   wherein the at least one member is from the plurality of new machine learning models and from the plurality of first revised machine learning models, respectively.

8. The method of claim 1, further comprising:
   performing a review membership leakage quantification on the trained machine learning model, wherein the review membership leakage quantification quantifies a second membership leakage of the removal data and uses the at least one new machine learning model for comparison;
   determining a review leakage score from the review membership leakage quantification; and
   comparing the first leakage score to the review leakage score, wherein the first leakage score being lower than the review leakage score indicates at least partial effectiveness of the forgetting mechanism.

9. A computer system for testing data removal from a trained machine learning model trained with a training data set, the computer system comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   training at least one new machine learning model by using an altered data set, the altered data set comprising training data from the training data set, the altered data set being without removal data;
   applying a first forgetting mechanism to the trained machine learning model to form at least one first revised machine learning model, the applying of the first forgetting mechanism comprising removing the removal data from the trained machine learning model;

performing a first membership leakage quantification on the at least one first revised machine learning model, wherein the first membership leakage quantification quantifies a first membership leakage of the removal data and uses the at least one new machine learning model for comparison; and determining a first leakage score from the first membership leakage quantification.

10. The computer system of claim 9, wherein the method further comprises presenting a confirmation of removal of the removal data if the first leakage score is lower than a threshold value.

11. The computer system of claim 9, wherein the method further comprises:

applying a second forgetting mechanism to the trained machine learning model to form at least one second revised machine learning model, the applying of the second forgetting mechanism comprising removing the removal data from the trained machine learning model;

performing a second membership leakage quantification on the at least one second revised machine learning model, wherein the second membership leakage quantification quantifies a second membership leakage of the removal data and uses the at least one new training model for comparison;

determining a second leakage score from the second membership leakage quantification; and comparing the first leakage score to the second leakage score and ranking the first forgetting mechanism and the second forgetting mechanism based on the comparing.

12. The computer system of claim 9, wherein the at least one new machine learning model comprises a plurality of new machine learning models;

wherein the at least one first revised machine learning model comprises a plurality of first revised machine learning models;

wherein the first membership leakage quantification further comprises:

comparing a first distribution of the plurality of new machine learning models to a second distribution of the plurality of revised machine learning models to determine a first difference, wherein the first leakage score is determined based on the first difference.

13. The computer system of claim 12, wherein the comparing the first distribution to the second distribution comprises determining first distribution parameters and second distribution parameters;

wherein the first distribution parameters comprise at least one member selected from the group consisting of a respective first mean and a respective first standard deviation; and wherein the second distribution parameters comprise at least one member selected from the group consisting of a respective second mean and a respective second standard deviation.

14. The computer system of claim 12, wherein the comparing the first distribution to the second distribution comprises:

comparing a first Gaussian approximation of first parameters of the first distribution to a second Gaussian approximation of second parameters of the second distribution; and performing at least one test selected from the group consisting of: a Kullback-Leibler divergence, a Kolmogorov-Smirnov test, and a T-test.

15. The computer system of claim 12, wherein the first and the second distributions are formed from at least one member selected from the group consisting of: a weight, a gradient, an activation, and an output; and wherein the at least one member is from the plurality of new machine learning models and from the plurality of first revised machine learning models, respectively.

16. A computer program product for testing data removal from a trained machine learning model trained with a training data set, the computer program product comprising a computer-readable storage medium having program instructions embodied therewith, wherein the program instructions are executable by a computer system to cause the computer system to perform a method comprising:

training at least one new machine learning model by using an altered data set, the altered data set comprising training data from the training data set, the altered data set being without removal data;

applying a first forgetting mechanism to the trained machine learning model to form at least one first revised machine learning model, the applying of the first forgetting mechanism comprising removing the removal data from the trained machine learning model;

performing a first membership leakage quantification on the at least one first revised machine learning model, wherein the first membership leakage quantification quantifies a first membership leakage of the removal data and uses the at least one new machine learning model for comparison; and determining a first leakage score from the first membership leakage quantification.

17. The computer program product of claim 16, wherein the method further comprises presenting a confirmation of removal of the removal data if the first leakage score is lower than a threshold value.

18. The computer program product of claim 16, wherein the method further comprises:

applying a second forgetting mechanism to the trained machine learning model to form at least one second revised machine learning model, the applying of the second forgetting mechanism comprising removing the removal data from the trained machine learning model;

performing a second membership leakage quantification on the at least one second revised machine learning model, wherein the second membership leakage quantification quantifies a second membership leakage of the removal data and uses the at least one new machine learning model for comparison;

determining a second leakage score from the second membership leakage quantification; and comparing the first leakage score to the second leakage score and ranking the first forgetting mechanism and the second forgetting mechanism based on the comparing.

19. The computer program product of claim 16, wherein the at least one new machine learning model comprises a plurality of new machine learning models;

wherein the at least one first revised machine learning model comprises a plurality of first revised machine learning models;

wherein the first membership leakage quantification further comprises:

comparing a first distribution of the new machine learning models to a second distribution of the revised machine learning models to determine a first difference, wherein the first leakage score is determined based on the first difference.

20. The computer program product of claim 19, wherein the comparing the first distribution to the second distribution comprises determining first distribution parameters and second distribution parameters;
    wherein the first distribution parameters comprise at least one member selected from the group consisting of a respective first mean and a respective first standard deviation; and
    wherein the second distribution parameters comprise at least one member selected from the group consisting of a respective second mean and a respective second standard deviation.

* * * * *